United States Patent [19]

Gorman

[11] Patent Number: 4,636,138

[45] Date of Patent: * Jan. 13, 1987

[54] INDUSTRIAL ROBOT

[75] Inventor: Robert H. Gorman, Clinton, Pa.

[73] Assignee: American Robot Corporation, Pittsburgh, Pa.

[*] Notice: The portion of the term of this patent subsequent to Jan. 3, 2001 has been disclaimed.

[21] Appl. No.: 443,156

[22] Filed: Nov. 19, 1982

Related U.S. Application Data

[63] Continuation-in-part of Ser. No. 346,222, Feb. 5, 1982, Pat. No. 4,424,473.

[51] Int. Cl.$^4$ .............................................. B66C 23/16
[52] U.S. Cl. ................................ 414/735; 74/665 D; 901/15; 901/21; 901/23; 901/26; 901/48
[58] Field of Search ............... 414/735, 719; 901/14, 901/15, 21, 23–27, 48; 74/665 A, 665 D, 469; 318/568

[56] References Cited

U.S. PATENT DOCUMENTS

| | | | |
|---|---|---|---|
| 2,459,253 | 1/1949 | Tyrner | 318/8 |
| 3,146,386 | 8/1964 | Gerber | 318/8 |
| 3,201,156 | 8/1965 | Coats | 285/365 |
| 3,817,403 | 6/1974 | Glachet et al. | 414/735 |
| 3,922,930 | 12/1975 | Fletcher et al. | 414/1 X |
| 3,967,837 | 7/1976 | Westerlund et al. | 285/365 X |
| 3,985,238 | 10/1976 | Nakura et al. | 414/735 |
| 4,062,455 | 12/1977 | Flatau | 414/735 |
| 4,068,536 | 1/1978 | Stackhouse | 74/417 |
| 4,068,763 | 1/1978 | Fletcher et al. | 414/4 |
| 4,246,661 | 1/1981 | Pinson | 3/1.1 |
| 4,289,996 | 9/1981 | Barnes et al. | 318/38 |
| 4,300,198 | 11/1981 | Davini | 364/513 |
| 4,370,091 | 1/1983 | Gagliardi | 414/735 |
| 4,392,776 | 7/1983 | Shum . | |

FOREIGN PATENT DOCUMENTS

| | | |
|---|---|---|
| 00447372 | 1/1982 | European Pat. Off. . |
| 2224349 | 11/1973 | Fed. Rep. of Germany . |
| 2228598 | 3/1974 | Fed. Rep. of Germany . |
| 2754609 | 6/1979 | Fed. Rep. of Germany . |
| 1266080 | 5/1961 | France . |
| 2208762 | 6/1974 | France . |
| 1180500 | 2/1970 | United Kingdom . |
| 1455782 | 11/1976 | United Kingdom . |
| 2045720 | 11/1980 | United Kingdom . |
| 2058009 | 4/1981 | United Kingdom . |
| 763082 | 9/1980 | U.S.S.R. . |

*Primary Examiner*—Donald W. Underwood
*Attorney, Agent, or Firm*—Bell, Seltzer, Park & Gibson

[57] ABSTRACT

An industrial robot is disclosed which is movable about six revolute axes, and which is modular in nature, to permit it to be configured to efficiently operate in a number of different applications. The robot includes a support stand defining a first primary axis, a waist which is rotatable about the first axis and which defines a second primary axis disposed perpendicular to the first axis, an inner arm fixed to the waist for rotation about the second axis, an outer arm fixed to the inner arm for relative rotation about a third primary axis, and a hand assembly mounted at the end of the outer arm. In addition, the outer arm includes a simplified drive arrangement composed of three concentric tubular members and respective drive motors, for moving the hand assembly of the robot about three additional axes of movement. The drive units for the three primary axes of movement are substantially identical to each other, and each includes an electric stepping motor and a brake, with the motor and brake being controlled by the program of a digital computer or the like. A novel transmission is mounted within the inner arm to effect movement of the outer arm about the third primary axis, and with the transmission being adapted to avoid relative rotation and backlash between the components of the transmission to thereby provide for the highly accurate controlled movement of the outer arm and its hand assembly.

15 Claims, 16 Drawing Figures

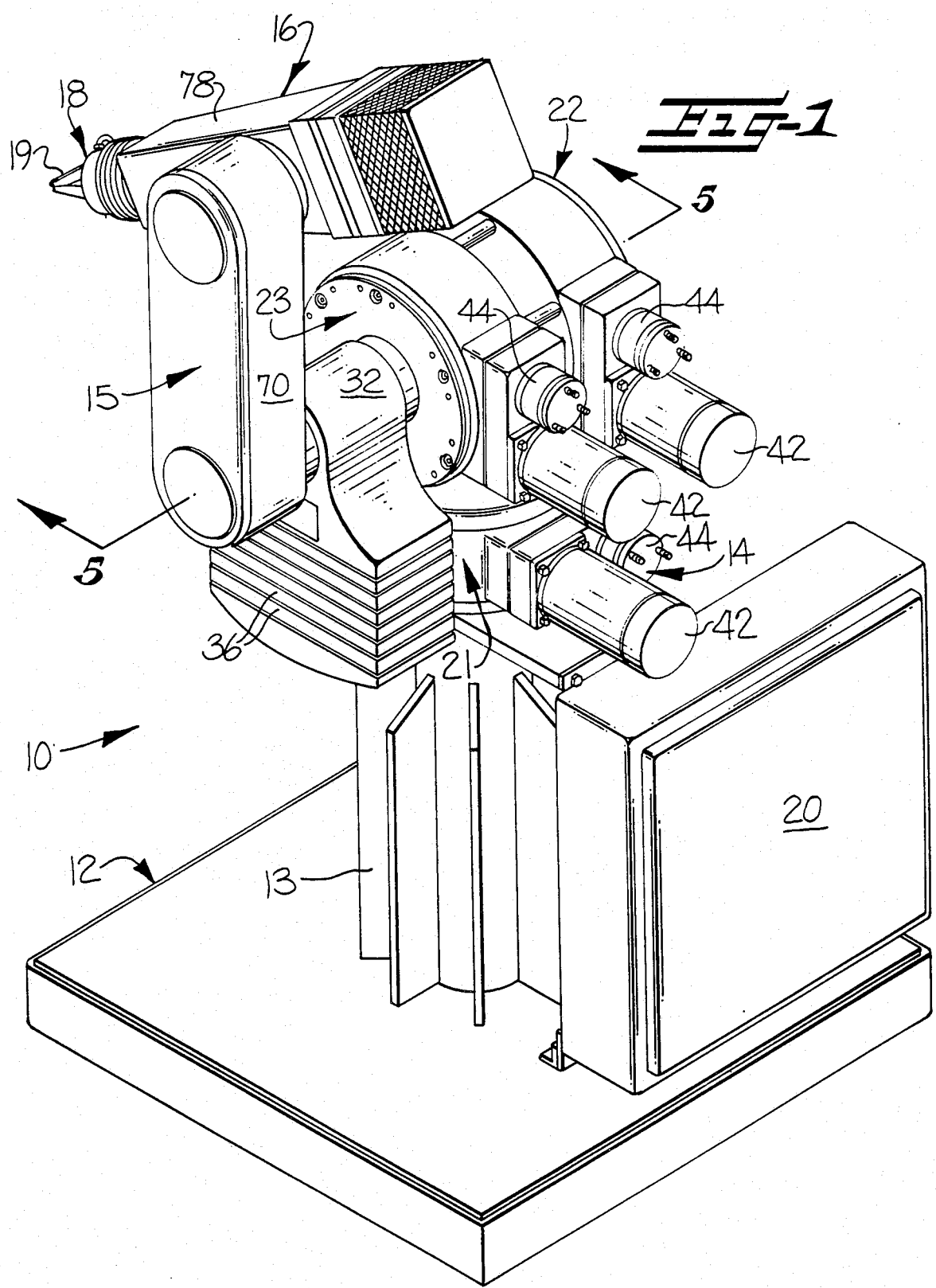

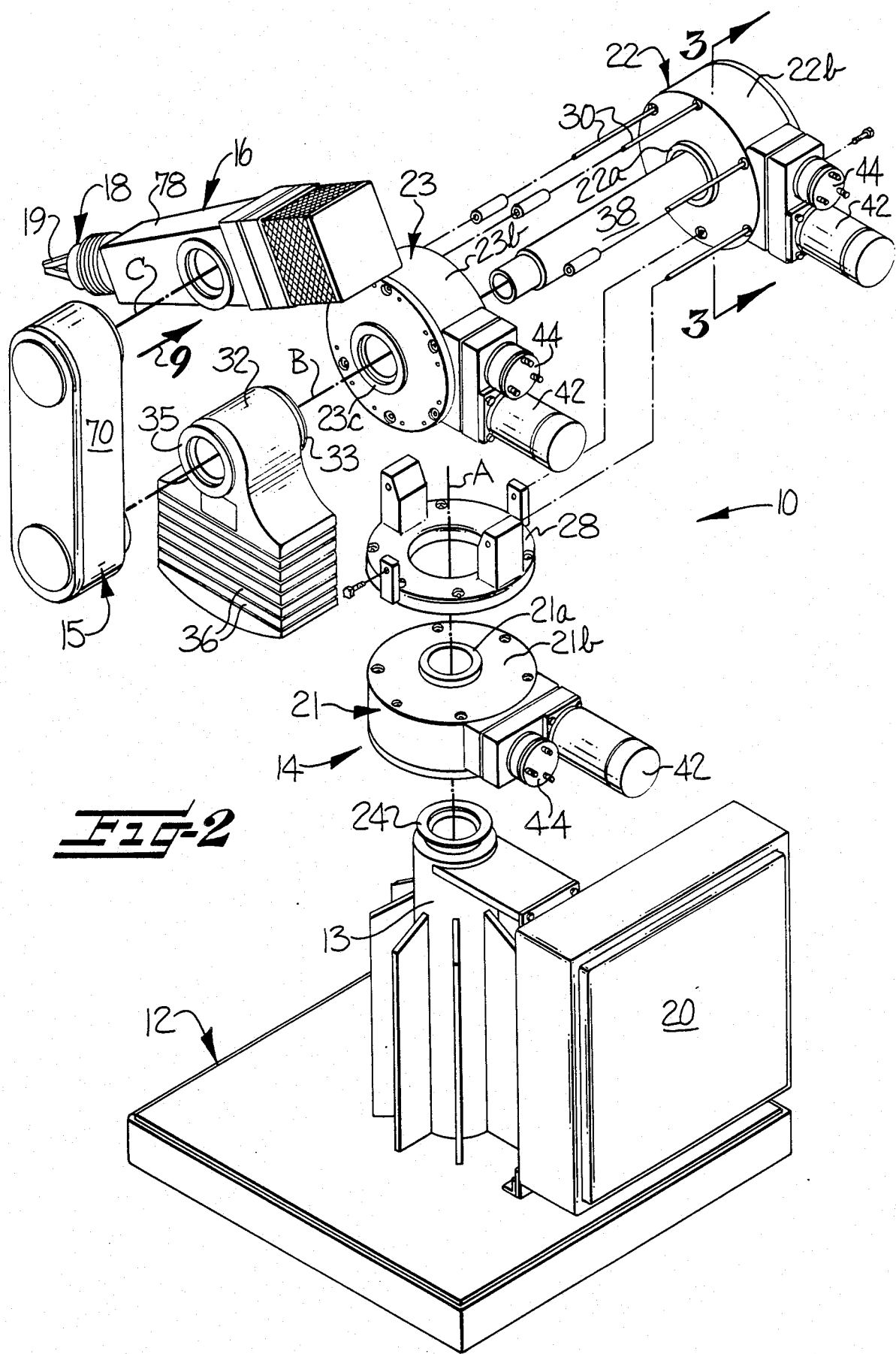

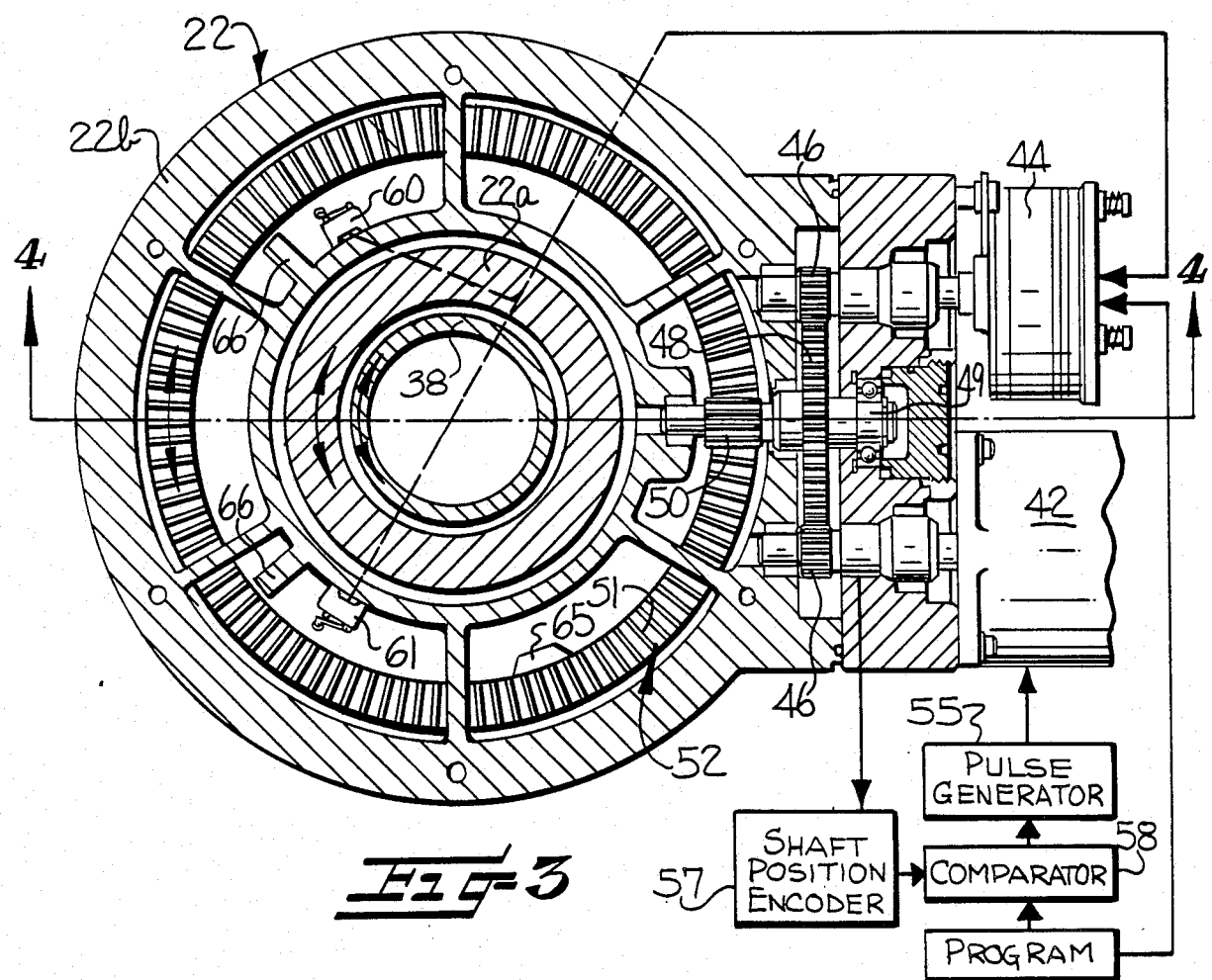
$\XoverbarIGoverbar\text{-}3$
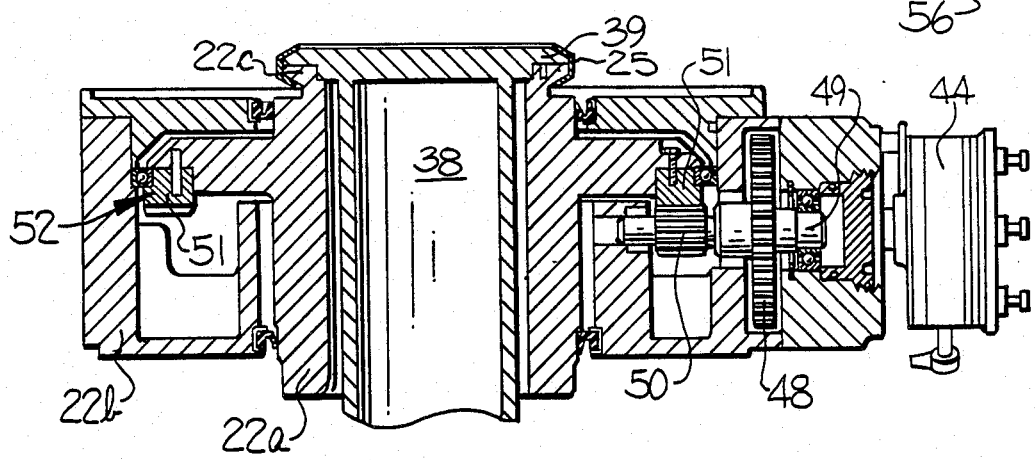
$\XoverbarIGoverbar\text{-}4$

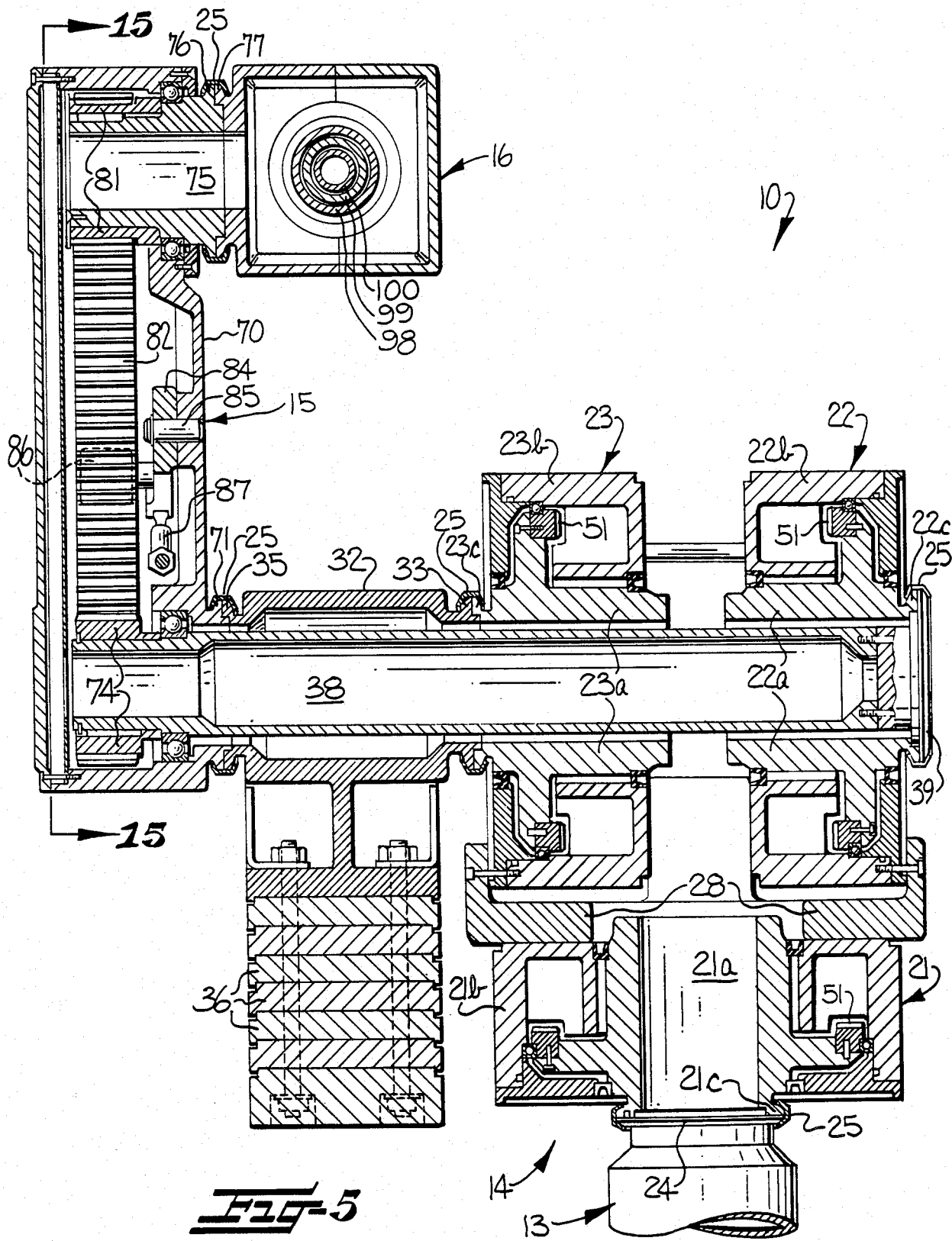

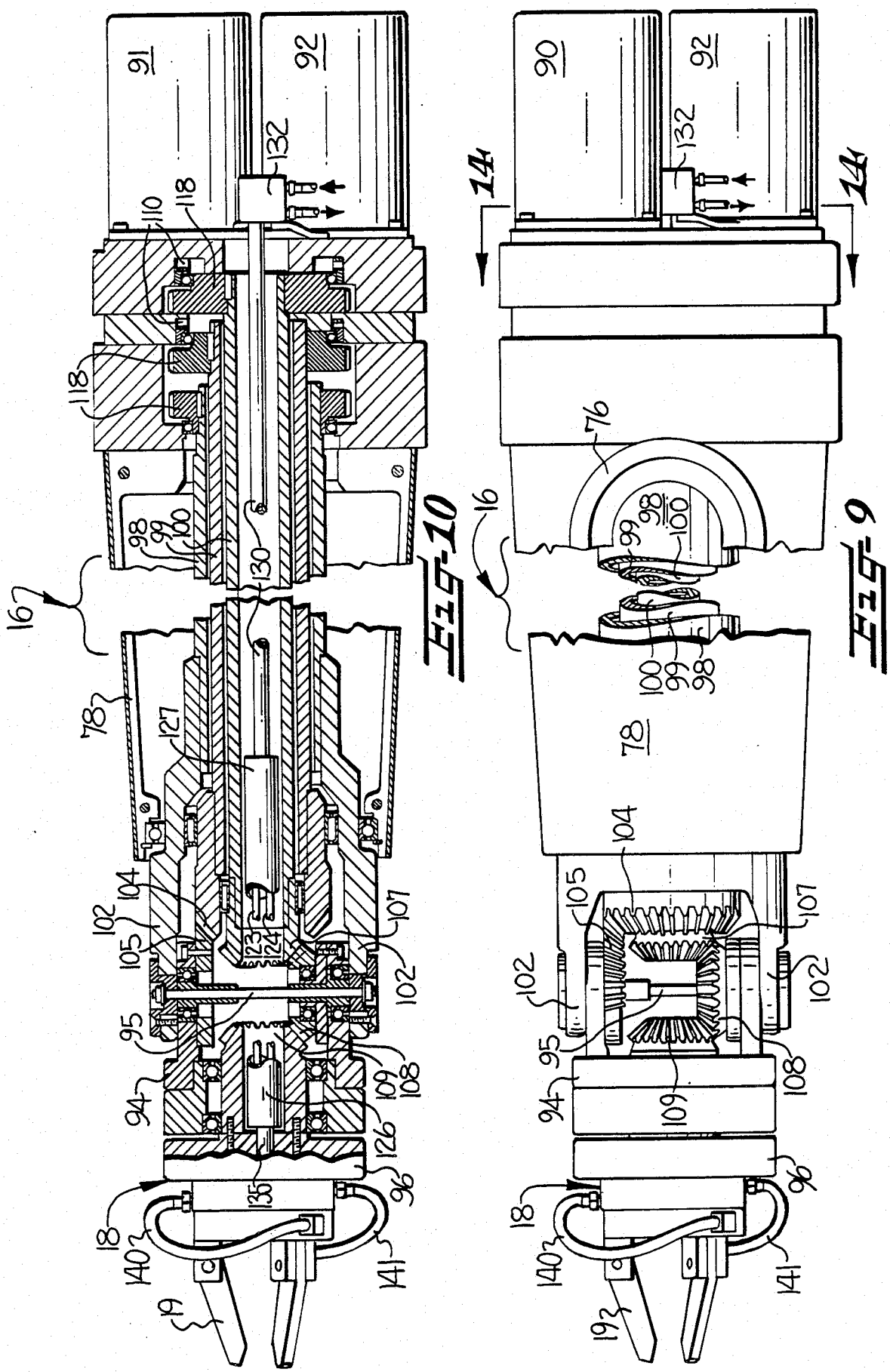

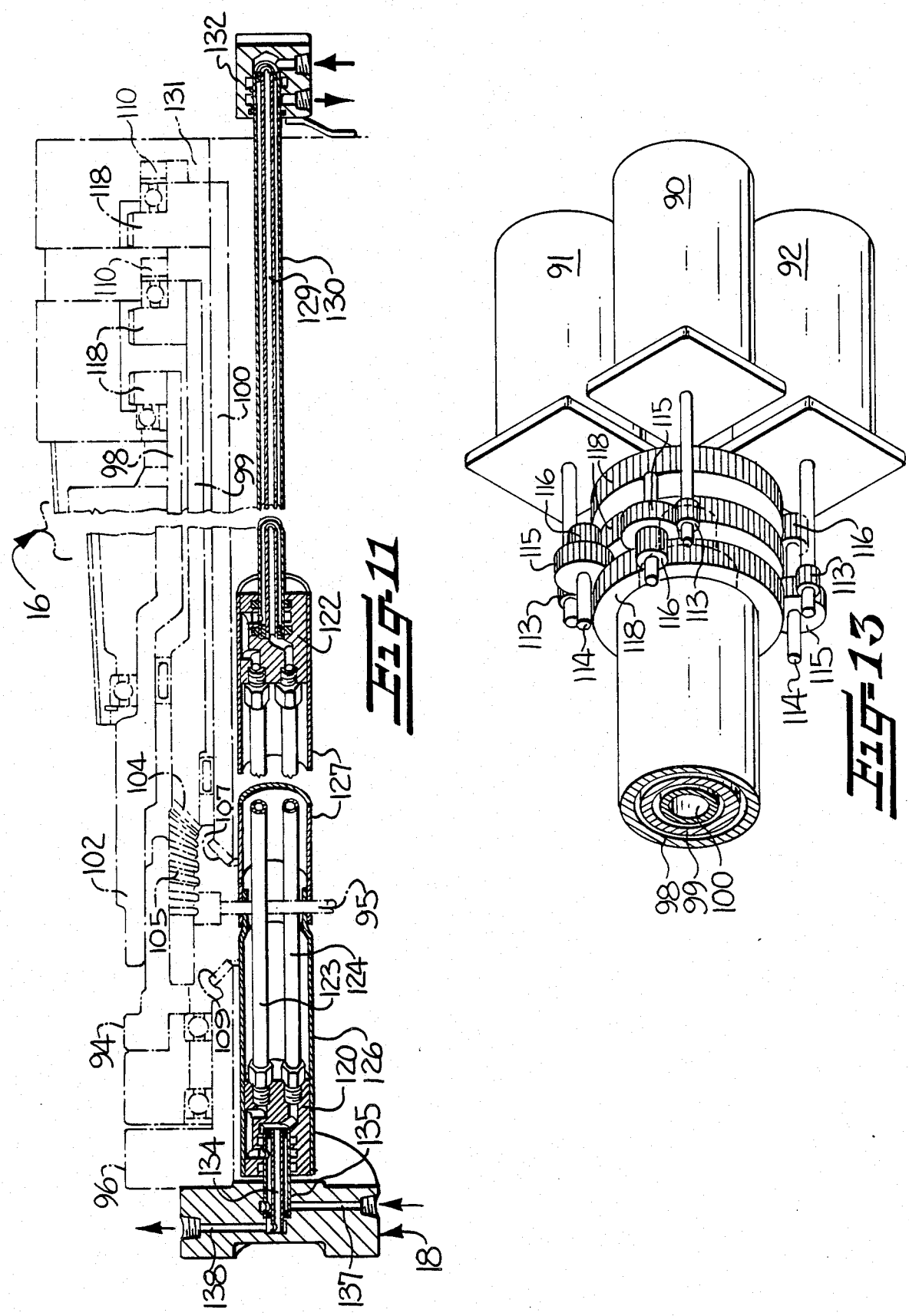

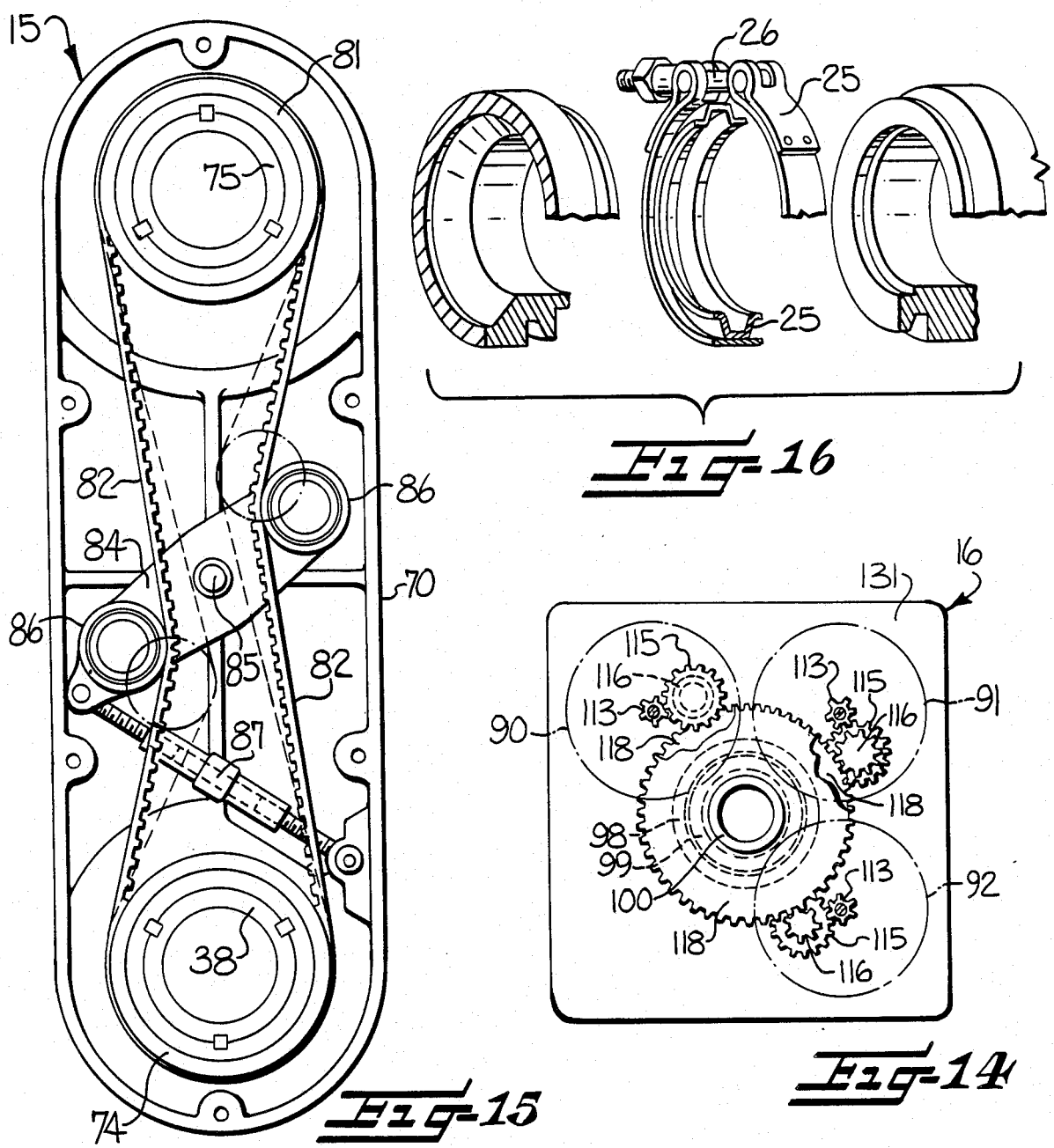

INDUSTRIAL ROBOT

This is a continuation-in-part of application Ser. No. 346,222 filed Feb. 5, 1982, now U.S. Pat. No. 4,424,473. Reference is also made to the subsequently filed application Ser. No. 524,839, now U.S. Pat. No. 4,552,505.

The present invention relates to an industrial robot of the type designed as a replacement for human labor in performing repetitive, hazardous, or tiring work.

Industrial robots of the described type typically have the capability of moving through six revolute axes to manipulate objects, parts, or tools through variable programmed motions for the performance of a variety of tasks. Reprogrammable robots are also available which incorporate a computer and microprocessor whereby the robot may be taught to move from point to point using a portable teaching box or the like.

Conventional robots of the type adapted to move through six revolute axes are generally large and bulky, and are quite expensive. Thus the use of such robots in applications requiring a smaller number of movements may not be possible by reason of space limitations, and in any event their use in such applications would be economically inefficient.

In addition to the above limitations, presently available commercial robots commonly have an outer arm assembly which is adapted to move a hand assembly through three axes of movement. The known drive systems for the outer arm assembly of such prior robots are quite complex, requiring a complicated drive train of gears and drive rods leading from each of the three drive motors through the arm and to the hand assembly. As a result, present outer arm assemblies are expensive, unduly heavy, and subject to malfunction due to wear or breakage of one of the numerous components.

Presently known robots are also deficient in that the components along the drive train in the outer arm assembly are subject to misalignment resulting from wear, which severely limits the ability to precisely control the movement of the hand assembly. Also, the drive train leading to the outer arm assembly is subject to backlash between the various components thereof, which further limits the ability to precisely control the movement of the hand assembly.

It is accordingly an object of the present invention to provide an industrial robot of the described type which effectively overcomes the above described limitations and deficiencies of the known robots.

It is a more particular object of the present invention to provide an industrial robot which is of modular construction, so as to permit it to be configured to serve a variety of applications.

It is a further object of the present invention to provide an industrial robot of the described type, and which incorporates three separate drive units for controlling movement about its three primary axes, with the drive units being substantially identical to thereby facilitate replacement and repair of the components and to reduce the cost thereof.

It is also an object of the present invention to provide an industrial robot which permits precisely controlled movement of the hand assembly within each of its axes of movement, and which effectively compensates for wear and misalignment of the gears within the various gear trains which lead to the hand assembly.

It is still another object of the present invention to provide a drive means for transmitting rotational movement to the outer arm assembly of an industrial robot, and which effectively avoids backlash and thereby permits precise control of the rotational movement thereof.

These and other objects and advantages of the present invention are achieved in the embodiment illustrated herein by the provision of a modular industrial robot which comprises first, second, and third drive units of like construction, and which are adapted to move the robot about its three primary axes of movement. Each drive unit includes a base component and a secondary component which is rotatable with respect to the base component, and with the base component including a mounting flange. A coupler is provided for releasably connecting each of the mounting flanges to a mating flange on an external member, such as a support stand or output shaft. Also, the secondary components of all three of the drive units are releasably interconnected to each other, whereby the robot may be configured to have one, two, or all three of the drive units.

The coupler for connecting the mounting flange of the drive units to the external member comprises a V-shaped split band which is adapted to enclose the periphery of the adjacent flanges when they are disposed in a mating, contiguous relation so as to maintain the assembly thereof.

When the robot is configured to include all three of the drive units, the base component of the first component will be coupled to a support stand so as to define a first axis, and the second and third drive units will be interconnected to the secondary component of the first drive unit and so as to be coaxially disposed about a second axis which is perpendicular to and intersects the first axis.

In a preferred embodiment, the robot includes an inner arm which is connected to one of the drive units by a similar V-band coupler, and an outer arm which is pivotally connected to the inner arm by still another V-band coupler. Thus the outer arm may be selectively removed from its connection with the inner arm and then mounted to the drive unit which initially mounted the inner arm, or alternatively, the outer arm may be mounted directly to the support stand.

As indicated above, the illustrated robot includes three primary axes of movement, with the drive unit for each of the movements being substantially identical to each other. Each such drive unit comprises an electric stepping motor and brake, and the outputs of the motor and brake are mounted parallel to each other and are operatively connected to a gear wheel disposed coaxially about the moveable axis of the drive unit.

The robot of the present invention also includes a three axis outer arm assembly, which includes an outer hand assembly, and three concentric tubular members having suitable interconnecting gears for operating the hand assembly for movement about its three axes. The tubular members are each selectively rotatable by a separate electric stepping motor mounted adjacent the end of the outer arm assembly opposite the hand assembly. Also, at least two of the tubular members are preferably mounted so as to permit limited axial movement, and spring biasing means is provided for biasing the axially movable tubular members so as to insure proper meshing engagement of the gears and to compensate for any wear thereof. Further, the gear train from each stepping motor to each tubular member has the same gear ratio, to thereby facilitate and simplify the control of the stepping motors.

The preferred embodiment of the invention also includes a novel drive arrangement for the inner and outer arms, which permits precisely controllable relative movement between the two arms. The drive arrangement includes a flexible endless toothed belt mounted between input and output sprockets, and means for contacting and deflecting each run of the conveyor belt so as to deflect the runs in equal amounts and in opposite directions, to thereby permit the belt to be maintained in a tensioned condition and substantially avoid backlash, and while also avoiding relative rotation between the input and output shafts upon adjustment of the tension in the belt.

Some of the objects of the invention having been stated, other objects and advantages will appear as the description proceeds, when taken in connection with the accompanying drawings, in which FIG. 1 is a perspective view of an industrial robot which embodies the features of the present invention;

FIG. 2 is an exploded perspective view of the robot;

FIG. 3 is a sectional view of one of the drive units of the robot, and taken substantially along the line 3—3 of FIG. 2;

FIG. 4 is a sectional view of the drive unit of FIG. 3, and taken substantially along the line 4—4;

FIG. 5 is a sectional view of the robot, and taken substantially along line 5—5 of FIG. 1;

Figure 6:
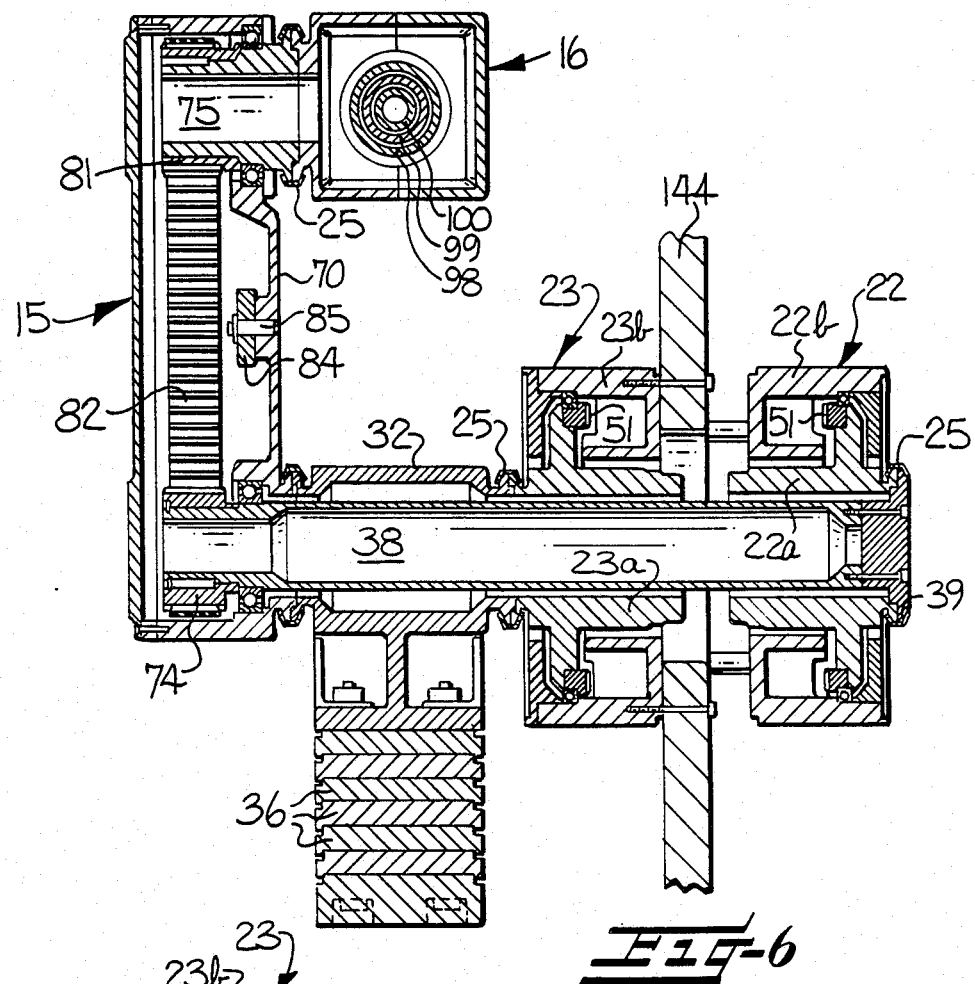
Figure 7:
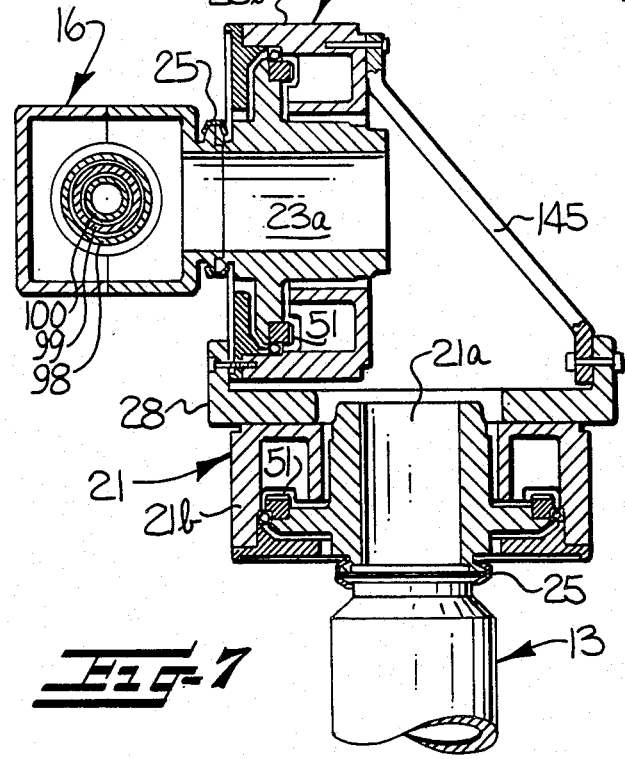
Figure 8:
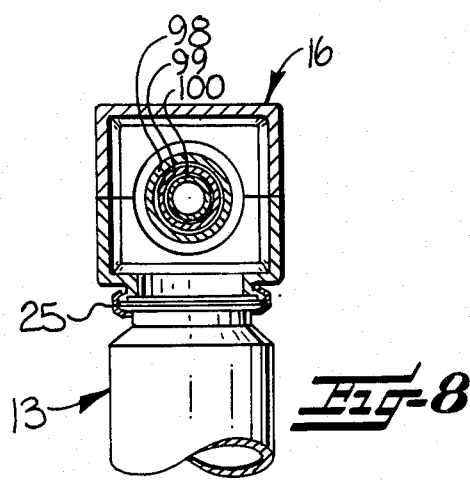

FIGS. 6—8 are sectional views illustrating alternative configurations of the robot;

FIG. 9 is a side elevation view of the outer arm assembly of the robot and taken along the direction of the arrow 9 in FIG. 2;

FIG. 10 is a sectional view of the assembly shown in FIG. 9;

FIG. 11 is a fragmentary sectional view illustrating the pneumatic control line leading through the outer arm assembly for controlling the gripper thereof;

FIG. 12 is a view similar to FIG. 10 and illustrating a second embodiment of the outer arm assembly;

FIG. 13 is a perspective view illustrating the drive system for the outer arm assembly.

FIG. 14 is a sectional view of the drive system and taken substantially along the line 14—14 of FIG. 9;

FIG. 15 is a side elevation view of the inner arm of the robot, taken along line 15—15 of FIG. 5, with the cover removed to illustrate the internal drive belt thereof; and FIG. 16 is an exploded perspective view, partly sectioned, of one of the coupling means of the present invention;

Referring more particularly to the drawings, a robot embodying the features of the present invention is indicated generally at 10. The robot is adapted to move through six revolute axes, and it comprises a main frame 12 which includes a support stand 13, with the stand defining a generally vertical axis A in the illustrated embodiment. A waist 14 is rotatable with respect to the stand and defines a generally horizontal axis B, which is perpendicular to and intersects the axis A. A first or inner arm 15 is rotatable with respect to the waist about the horizontal axis B, and a second or outer arm 16 is rotatable with respect to the inner arm about a second horizontal axis C, which is parallel to and laterally spaced from the axis B. A hand assembly 18 including a gripper 19 is mounted at one end of the outer arm, and is adapted to move through three additional axes of movement as further described below. In addition, the main frame of the robot includes a control box 20 mounted to the frame adjacent the stand 13 for housing the electronic controls for the various drive motors of the robot.

As best seen in FIGS. 2 and 5, the robot 10 further includes a first drive unit 21 having a tubular base component 21a and a secondary component 21b which is rotatable with respect to the base component about the axis A. The base component 21a is releaseably connected to the support stand 13 by coupling means which includes a circular flange 24 on the support stand, and a mating circular flange 21c integrally formed on the base component, with the two flanges 21c, 24 being of like diameter and cross sectional configuration. The coupling means further includes a releasable coupler 25 in the form of a split band of generally V-shaped configuration which is adapted to enclose the periphery of the mating flanges when they are placed in abutting relation. The split band incorporates a release mechanism 26 (note FIG. 16) comprising a threaded shaft and nut, for selectively opening and tightening the band circumferentially about the periphery of the abutting flanges, and so as to selectively retain the flanges in assembled relation.

A ring-like carriage 28 is mounted to the secondary component 21b of the first drive unit 21, and the carriage in turn mounts a second drive unit 22 and a third drive unit 23 which collectively form a part of the waist 14 of the robot. As will become apparent from the detailed description of the three drive units as set forth below, the units are of substantially identical configuration, and this standardization of drive units greatly simplifies the design, construction, and repair of the overall apparatus, and promotes the interchangeability of parts. For present purposes it will be seen that the second and third drive units 22, 23 each include a tubular base component 22a, 23a having a mounting flange 22c, 23c at one end, and a secondary component 22b, 23b which is relatively rotatable about the axis of its base component. The secondary components 22b, 23b are fixed to each other and to the carriage 28 by removable bolts 30 or the like, and such that the second and third drive units are coaxially disposed about the axis B. Also, the second and third drive units are disposed in opposite orientations as will be apparent from FIG. 5.

A tubular extension 32 is releasably connected to the base component 23a of the third drive unit 23 by coupling means, which includes a circular flange 33 at one end of the extension and which mates with the flange 23c on the base component of the drive unit. The abutting flanges are releasably coupled by a V-band coupler 25 of a construction corresponding to that joining the flanges 21c and 24 at the support stand. The tubular extension 32 includes a second flange 35 at its other end for the purposes to be described. In addition, the extension mounts a number of weights 36 which serve to counterbalance the weight of the outer arm 16 during the movement about the axis B.

The base component 22a of the second drive unit 22 mounts an elongate drive shaft 38 which extends coaxially through the base component 23a of the third drive unit and extension 32. The drive shaft 38 includes a flange 39 at one end which is releasably joined to the flange 22c of the base component of the second drive unit by another coupler 25.

FIGS. 3 and 4 illustrate the second drive unit 22 in more detail, and which is also representative of the first and third drive units. The drive unit 22 comprises a pair of electric drive members 42, 44 fixed to the secondary component 22b of the unit. The member 42 is in the form of an electric stepping motor, and the member 44 is in the form of a conventional electromagnetic brake. The output shafts of the members are disposed parallel to each other, and each mounts a drive gear 46. A pinion gear 48 is rotatably mounted to the secondary component and is positioned to operatively mesh with each of the drive gears 46. A shaft 49 extends coaxially from the pinion gear and mounts an output gear 50, which is positioned to mesh with the face gear 51 of the gear wheel 52, with the gear wheel being fixed to the base component 22a coaxially about the axis A.

The face gear 51 is in the form of a circular rack, i.e., the faces of the gear teeth are co-planar and lie in a plane perpendicular to its rotational axis. This configuration facilitates the alignment and assembly of the output gear 50 with the face gear 51, since alignment along only a single direction is required, rather than a plurality of directions as would be required by conventional bevel gears.

Electrical stepping motors are per se well known in the art and are operated by discrete electrical pulses which are fed in a sequential manner from a suitable switching control system. For every pulse fed to the motor, the motor rotates a fixed angle, typically 1.8 degrees. Thus the number of pulses fed to the motor determines the rotational angle the motor will make. In order to obtain verification that the motor has in fact rotated, it is also common to mount a shaft encoder on the output shaft of the motor, which produces a verification signal upon each step having been taken.

The drive control for the motor 42 and brake 44 is schematically illustrated in FIG. 3, and includes a suitable switching apparatus or pulse generator 55, which is operatively connected to the motor. The operation of the generator 55 is controlled by a program 56 of a digital computer or the like. The shaft encoder 57 feeds a verification signal to a comparator 58 upon each rotational step of the motor. Should the comparator detect a failure of rotation, a suitable corrective signal is fed to the generator. By this arrangement, a highly reliable positional movement in accordance with the desired program may be achieved. The program also controls operation of the brake 44, to actuate the brake whenever the motor is inoperative The secondary component 22b of the drive unit may also mount a pair of limit switches 60, 61 as illustrated schematically in FIG. 3. The limit switches serve as safety switches to limit the angular movement of the base member 22a with respect to the secondary member 23b. More particularly, the switches are closed by engagement with a stop 65 positioned on the inner side of face gear 51, and upon closure of either switch of the pair, the brake 44 is actuated to preclude further rotation. A positive abutment 66 is also shown mounted on the secondary member 22b downstream of each of the switches, which is designed to be positively engaged by the stop 65 and provide absolute protection against excessive relative rotation in the event the adjacent switch should fail.

The inner arm 15 of the robot comprises a casing 70, which has a mounting flange 71 at one end which is releaseably connected to the flange 35 of the extension 32 by still another coupler 25, which also conforms to the structure of the other couplers utilized on the robot. The shaft 38 from the second drive unit extends coaxially through the flange 71 of the casing, and mounts a sprocket 74 at the free end thereof.

A second shaft 75 is rotatably mounted at the other end of the casing 70, and is disposed coaxially about the horizontal axis C, which is parallel to and laterally spaced from the horizontal axis B. The shaft 75 includes an integral flange 76 which mates with a flange 77 on the casing 78 of the outer arm 16, and the two flanges are joined by a further V-band coupler 25. The second shaft 75 mounts a sprocket 81 within the casing 70 of the inner arm, and a flexible endless toothed belt 82 is operatively entrained about the sprockets. By this arrangement, the rotation of the base component 22a of the second drive unit 22 is transmitted to the outer arm 16, causing the outer arm to rotate about the axis C.

As will be appreciated from the above description, precisely controlled movement of the outer arm 16 is necessary in order to achieve a high degree of accuracy in the movement of the hand assembly 18. To achieve this desired precise relative movement, there must be no significant relative rotation between the shafts 38 and 75, and thus there must be no significant play or "backlash" between the belt 82 and sprockets 74, 81. For this purpose, there is provided adjustable means for contacting and deflecting each run of the belt 82 so as to selectively deflect the runs in equal amounts and in opposite directions. Such deflection causes the belt to be maintained in a tensioned condition, and "backlash" in the relative rotation of the shafts is effectively avoided. Also, relative rotation of the shafts during adjustment of the tension in the belt is avoided, which would tend to upset the calibration of the hand assembly. As best seen in FIG. 15, the adjustment means includes a pivot arm 84 mounted within the casing 70 of the inner arm for pivotal movement about a pin 85 which defines an axis which is positioned between and parallel to the axes B and C. Also, the rotational axis of the pin 85 is positioned to intersect a line extending perpendicularly between the axes B and C. A roller 86 is mounted at each end of the pivot arm, and an adjustable linkage 87 interconnects the pivot arm and the casing of the inner arm, whereby the pivot arm may be positioned such that the rollers 86 contact the outside surface of the belt on respective runs thereof. As will be understood, movement of the linkage to draw the rollers into contact with the runs of the belt so as to tighten the belt, results in each run being equally deflected, so as to cause no relative rotation between the shafts 38 and 75.

The outer arm 16 of the robot is best seen in FIGS. 9 and 10, and includes the hand assembly 18 and gripper 19 mounted at one end, and three stepping motors 90, 91, 92 mounted at the other end for operatively moving the hand assembly about its three axes of movement. More particularly, the hand assembly includes a frame member 94, a transverse wrist pin 95 mounted to the frame member, and a wrist rotary member 96 rotatably mounted with respect to said frame member 94. The gripper 19 is mounted to the wrist rotary member, with the fingers of the gripper being movable in either the opening or closing direction by separate air pressure lines as further described below.

The casing 78 of the outer arm 16 supports three coaxially disposed and relatively rotatable tubular members 98, 99, 100, for transmitting the desired movements to the components of the hand assembly from the respective drive motors 90, 91, 92. More particularly, there is provided a first tubular member 98 which is rotatably supported in the casing 78 by bearings, and which includes a yoke 102 at the outer end which mounts the transverse wrist pin 95. Thus rotation of the first tubular member 98 results in the rotation of the entire hand assembly about the central axis of the outer arm, which is commonly referred to as "wrist rotation." The second tubular member 99 is rotatably supported coaxially within the first member by bearings, and it includes a bevel gear 104 at its outer end. The bevel gear 104 meshes with a gear 105 which is disposed about the axis of the wrist pin 95 and which is fixed to the frame member 94 of the hand assembly. Thus rotation of the second tubular member 99 causes the frame member 94 to pivot about the axis of the wrist pin, commonly referred to as "wrist flex."

The third tubular member 100 is rotatably mounted coaxially within the second member, and it also includes a bevel gear 107 at the outer end thereof. The bevel gear 107 meshes with an idler gear 108 rotatably mounted about the axis of the wrist pin, and which in turn meshes with a bevel gear 109 on the end of the wrist rotary member. Thus rotation of the third tubular member 100 causes the wrist rotary member to rotate with respect to the frame member, commonly referred to as "hand rotation."

The second and third tubular members 99, 100 are each mounted so as to permit limited axial movement thereof with respect to the first tubular member and casing, and a biasing annular wave spring 110 is mounted at the rear end of these members for resiliently urging the members in a direction toward the hand assembly, to thereby assure proper meshing of the associated bevel gears and to compensate for any wear thereof.

The three drive motors 90, 91, 92 of the outer arm are adapted to selectively rotate each of the first, second, and third tubular members about the central axis thereof, and relative to each other. The drive motors are operatively connected to respective tubular members by a gear train which includes an output gear 113 fixed to the output shaft of the associated motor, and a transmission rod 114 having one gear 115 meshing with the output gear 113 and a second gear 116 meshing with a gear 118 fixed to the end of the associated tubular member. Significantly, the three gear trains have the same gear ratio, to thereby facilitate and simplify the control of the stepping motors, note FIG. 13.

FIG. 11 illustrates in more detail the pneumatic system for actuating both the opening and closing of the gripper at the end of the outer arm 16. The system includes a rotary union 120 positioned within the wrist rotary member 96 of the hand assembly, a second rotary union 122 mounted within the tubular member 100, and a pair of flexible hoses 123, 124 extending between the two unions. The rotary union 120 is fixed to a sleeve 126, which in turn is mounted to the wrist pin 95. The rotary union 122 is fixed to a second sleeve 127, which also is mounted to the wrist pin. Thus, both of the rotary unions rotate with the wrist pin. In addition, there is provided a pair of coaxial rigid tubes 129, 130, which extend from rotary union 122 through the end plate 131 of the arm. The outer ends of the tubes are mounted to a coupler 132 by which two separate air lines may be connected to the two air passages defined by the coaxial tubes 129 130. The inner ends of these tubes are rotatably received in the union 122. A second pair of rigid tubes 134, 135 are fixed to the end block of the wrist rotary member 96 and are rotatably joined to the union 120 in the hand assembly. The two passages defined by the tubes 134, 135 communicate with respective ducts 137, 138 in the end block, which in turn lead to the gripper through the flexible hoses 140, 141. The gripper itself is generally conventional, and is adapted to close upon a workpiece upon air pressure being received through one line, and to open to release the workpiece upon air pressure being received through the other line.

FIG. 12 illustrates a modified and somewhat simplified configuration for the outer arm 16, which may be utilized where only wrist rotation and wrist flex are necessary. In this embodiment, the third or innermost tubular member 100 has been removed, together with the idler gear 108 and end portion of the wrist rotary member 96, and motor 92. The arm is otherwise structurally the same as described above with reference to FIGS. 9–11.

A further significant feature of the above described robot is the fact that it is essentially modular in nature, and it may be configured to serve a variety of specific applications. In addition, the use of the commonly structured coupling means between the various components of the robot greatly facilitates its reconfiguration. For example, as seen in FIG. 5, the robot is configured for movement about all of its six potential axes of movement. In FIG. 6 however, the first drive unit 21 has been removed, and the secondary components of the second and third drive units have been directly connected to a fixed support 144 by means of suitable bolts. This arrangement permits operation about five axes of movement. Also, it will be appreciated that the support 144 and thus the robot may be disposed in any orientation so as to extend for example from a floor, a vertical side wall, or a ceiling.

In FIG. 7 the second drive unit 22 has been removed, together with the inner arm 15, and the outer arm 16 has been connected to the flange 23c on the base component of the third drive unit. If desired, a suitable bracket 145 may be mounted between the drive unit 23 and the carriage 28, to provide improved rigidity. This arrangement provides a further variation of movement about five axes.

If only four axes of movement are necessary, the third drive unit, with the outer arm 16 attached thereto in the manner shown in FIG. 7, could be disconnected from the carriage 28 and the first drive unit 21, and mounted directly to the support 144 or other suitable mounting structure.

In FIG. 8, the outer arm 16 has been attached directly to the flange 24 of the support stand, to thereby provide a robot having the three axes of movement of the outer arm assembly. It will be understood that the reconfiguration of the outer arm assembly to that shown in FIG. 12 provides still another possible modification for each of the embodiments shown in FIGS. 5 through 8.

In the drawings and specification, there has been set forth a preferred embodiment of the invention, and although specific terms are employed, they are used in a generic and descriptive sense only and not for purposes of limitation.

That which is claimed is:

1. A modular industrial robot characterized by the ability to be configured to serve a variety of applications, and comprising a first drive unit having a base component and a secondary component which is relatively rotatable with respect to its base component, said base component including a mounting flange at one end thereof, means releaseably connecting said mounting flange of said first drive unit to an external member, a second drive unit having a base component and a secondary component which is relatively rotatable with respect to its base component, with said base component including a mounting flange at one end thereof, means releaseably connecting the secondary components of said first and second drive units, means releaseably connecting said mounting flange of said second drive unit to a second external member, a third drive unit having a base component and a secondary component which is relatively rotatable with respect to its base component, with said base component including a mounting flange at one end thereof, means releasably connecting the secondary component of said third drive unit to the secondary component of each of said first and second drive units, and means releasably connecting said mounting flange of said third drive unit to a third external member.

2. The industrial robot as defined in claim 1 wherein said first, second, and third drive units are of substantially identical configuration, and such that substantially all of the components thereof are interchangeable.

3. The industrial robot as defined in claim 2 wherein said mounting flange of each of said first, second and third drive units has a circular periphery, and each of said means releasably connecting a mounting flange to an external member comprises a circular flange positioned on each of the external members, with the flange of each of said external members conforming to the size of the flange of the associated drive unit, a split band of generally V-shaped configuration and adapted to enclose the periphery of the circular flange and a similar circular flange on the associated external component when the flanges are placed in abutting relation, and release means for selectively opening and tightening the band about the periphery of the abutting flanges to selectively retain the flanges in assembled relation.

4. A modular industrial robot characterized by the ability to be configured to serve a variety of applications, and comprising a support member, a first drive unit having a base component and a secondary component which is relatively rotatable with respect to its base component, coupling means releaseably connecting the base component of said first drive unit to said support member, a second drive unit having a base component and a secondary component which is relatively rotatable with respect to its base component, a third drive unit having a tubular base component and a secondary component which is relatively rotatable with respect to its base component, means releaseably connecting each of the secondary components of said first, second and third drive units to each other and with the second and third drive units being coaxially disposed about a second axis which is nonparallel to the rotational axis of said first drive unit, and a drive shaft fixed to the base component of said second drive unit and extending coaxially through said tubular base component of said third drive unit.

5. The industrial robot as defined in claim 4 wherein said second axis is perpendicular to and intersects the rotational axis of said first drive unit, and the first, second and third drive units are of substantially identical configuration, and the second and third drive units are disposed in opposite orientations along said second axis.

6. The industrial robot as defined in claim 4 further comprising a first arm, and first arm coupling means releaseably interconnecting said arm to said tubular base component of said third drive unit, and whereby the first arm may be pivoted about said second axis by said third drive unit.

7. The industrial robot as defined in claim 6 further comprising an output shaft mounted to said first arm for rotation about a third axis disposed parallel to and laterally spaced from said second axis, a second arm, second arm coupling means for releaseably connecting said second arm to said output shaft to permit rotation of said second arm about said third axis, and transmission means operatively connecting said output shaft to said drive shaft of said second drive unit, whereby the second arm may be pivoted about said third axis by said second drive unit.

8. The industrial robot as defined in claim 7 wherein said second arm coupling means and said first arm coupling means are of like configuration, whereby the first arm and second drive unit may be selectively removed from the robot and the second arm connected directly to the tubular base component of said third drive unit.

9. The industrial robot as defined in claim 8 wherein said second arm coupling means and said first drive unit coupling means are of like configuration, whereby the first, second and third drive units, and the first arm, may all be selectively removed from the robot, and the second arm connected directly to the support member.

10. The industrial robot as defined in claim 9 wherein each of (a) said first drive unit coupling means (b) said first arm coupling means, and (c) said second arm coupling means comprises a circular flange positioned on each of the components to be connected, with the flanges having a like diameter, a split band of generally V-shaped configuration and adapted to enclose the periphery of the mating flanges when they are placed in abutting relation, and release means for selectively opening and closing the band circumferentially about the periphery of the abutting flanges to selectively retain the flanges in assembled relation.

11. The industrial robot as defined in claim 6 wherein said first arm coupling means includes a tubular extension coaxially disposed between said base component of said third drive unit and said first arm, and counterweight means mounted to said extension for counterbalancing the weight of said second arm.

12. A modular industrial robot characterized by the ability to be configured to serve a variety of applications, and comprising a first drive unit having a tubular base component and a secondary component concentrically surrounding said base component, with one of said components being rotatable with respect to the other component, said base component including a mounting flange at end thereof, means releasably connecting said mounting flange of said first drive unit to an external member, a second drive unit having a tubular base component and a secondary component concentrically surrounding its associated base component, with one of said components of said second drive unit being rotatable with respect to the other component thereof, and with said base component of said second drive unit including a mounting flange at one end thereof, and with the base components and secondary components of said first and second drive units being of substantially identical configuration respectively, means releasably interconnecting the secondary components of said first and second drive units, and means releasably connecting said mounting flange of said second drive unit to a second external member, and wherein said external member which is connected to said mounting flange of said first drive unit includes a shaft which extends coaxially through said tubular base component of said second drive unit.

13. The industrial robot as defined in claim 12 wherein each of said means releasably connecting a mounting flange to an external member comprises a flange on each of the external members, with the mounting flange of each of said drive units conforming to the size of the flange of the associated external member, and means for releasably securing the mounting flange of each of said drive units in abutting relation with the flange of the associated external member.

14. The industrial robot as defined in claim 12 wherein said tubular base components of said first and second drive units are coaxially arranged to define a common central axis, and wherein said second external member comprises an inner arm which extends radially with respect to said central axis.

15. The industrial robot as defined in claim 14 further comprising an outer arm, means pivotally connecting said outer arm to said inner arm for relative rotation about a second axis disposed parallel to and laterally spaced from said central axis, and torque transmission means operatively connecting said shaft of said first drive unit to said outer arm, whereby said inner arm may be pivoted about said central axis by said second drive unit, and said outer arm may be pivoted about said second axis by said first drive unit.

* * * * *